(12) United States Patent
Mashiki

(10) Patent No.: US 7,051,713 B2
(45) Date of Patent: May 30, 2006

(54) FUEL INJECTION CONTROL APPARATUS FOR INTERNAL COMBUSTION ENGINE

(75) Inventor: Zenichiro Mashiki, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/152,337

(22) Filed: Jun. 15, 2005

(65) Prior Publication Data
US 2006/0005812 A1    Jan. 12, 2006

(30) Foreign Application Priority Data
Jul. 8, 2004    (JP) ............................. 2004-202055

(51) Int. Cl.
*F02B 7/00* (2006.01)
*F02B 7/02* (2006.01)

(52) U.S. Cl. ...................................... 123/431; 123/299

(58) Field of Classification Search ................ 123/431, 123/299, 295, 430
See application file for complete search history.

(56) References Cited

U.S. PATENT DOCUMENTS

| | | | |
|---|---|---|---|
| 4,487,188 A | 12/1984 | Inoue et al. | |
| 5,775,282 A | 7/1998 | Smith | |
| 6,978,762 B1 * | 12/2005 | Mori | 123/430 |
| 6,978,763 B1 * | 12/2005 | Ohtani | 123/430 |
| 2003/0127072 A1 | 7/2003 | Gmelin et al. | |
| 2005/0098154 A1 * | 5/2005 | Ohtani | 123/431 |

FOREIGN PATENT DOCUMENTS

| | | |
|---|---|---|
| DE | 101 58 872 A1 | 6/2003 |
| JP | A 7-103048 | 4/1995 |
| JP | A 7-103050 | 4/1995 |
| JP | A 9-303187 | 11/1997 |
| JP | A 10-176574 | 6/1998 |
| JP | A 2001-107789 | 4/2001 |
| JP | A 2001-336439 | 12/2001 |

* cited by examiner

*Primary Examiner*—Mahmoud Gimie
(74) *Attorney, Agent, or Firm*—Oliff & Berridge, PLC (57) ABSTRACT

An electronic control apparatus adjusts the pressure such that the fuel supply pressure of a high-pressure fuel supply system is reduced when in a low load mode corresponding to a low required injection quantity. When the operating status of the engine is shifted from a low load to a high load, the fuel supply pressure is boosted again. When determination is made that the current fuel supply pressure is lower than the target fuel supply pressure by at least a predetermined pressure C, the injection quantity ratio of the in-cylinder injector is set lower to reduce the required injection quantity of the in-cylinder injector. Accordingly, noise generated from the high-pressure fuel supply system can be minimized. Further, detrimental effects caused by insufficient fuel supply pressure of the high-pressure fuel supply system can be suppressed when the engine operating status is shifted from a low load to a high load.

12 Claims, 4 Drawing Sheets

FUEL INJECTION CONTROL APPARATUS FOR INTERNAL COMBUSTION ENGINE

This nonprovisional application is based on Japanese Patent Application No. 2004-202055 filed with the Japan Patent Office on Jul. 8, 2004, the entire contents of which are hereby incorporated by reference.

BACKGROUND OF THE INVENTION

1. Field of the Invention

The present invention relates to a fuel injection control apparatus for an internal combustion engine including an in-cylinder injection valve that directly injects fuel into the combustion chamber and an out-cylinder injection valve that injects fuel to the intake manifold.

2. Description of the Background Art

In controlling the fuel injection for an internal combustion engine, the value of the required quantity of fuel injection is determined according to the operating status of the engine. Fuel of the injection quantity corresponding to this required value (namely, the entire required injection quantity) is injected from the fuel injection valve. Such fuel injection valves include an in-cylinder injection valve that directly injects fuel into the combustion chamber of an internal combustion engine in addition to an injection valve (out-cylinder injection valve) that injects fuel to an intake manifold such as an intake port. When the in-cylinder injection valve is employed, conversion of injection fuel into fine particles must be facilitated since it is difficult to ensure a sufficient period of time for the injected fuel to be mixed with the incoming air to be vaporized. Therefore, an in-cylinder injection valve is adapted to increase the fuel supply pressure to inject fuel at a higher pressure, as compared to an out-cylinder injection valve.

There is proposed a fuel injection control apparatus including both an in-cylinder injection valve and an out-cylinder injection valve, wherein the injection quantity ratio of each injection valve to the entire required injection quantity at the starting time is set variable based on the fuel supply pressure of the high-pressure fuel supply system, i.e. the fuel supply pressure of the in-cylinder injection valve (Japanese Patent Laying-Open No. 2001-336439).

When the internal combustion engine is under high load such as at the time of going up a hill or during acceleration in such a conventional fuel injection control apparatus including both an in-cylinder injection valve and out-cylinder injection valve, the injection quantity ratio of the in-cylinder injection valve (required injection quantity=required fuel injection quantity) is increased to lower the temperature of the combustion chamber by the heat of vaporization from the fuel directly injected into the combustion chamber, whereby the intake efficiency, and in turn the engine output, is improved. The fuel supply pressure of the high-pressure fuel supply system is increased to conduct fuel injection of the required injection quantity in an appropriate manner.

The high-pressure fuel supply system includes a pump of high pressure and a metering valve for adjusting the fuel emission from the high-pressure pump. Noise is generated in accordance with the pump fuel pressurization and the opening/closure of the metering valve in the high-pressure fuel supply system. The noise generated from the high-pressure fuel supply system is apt to become more noticeable at the time of lower load on the engine where other noises (for example, the noise of burning fuel in the engine or the noise generated from the driving mechanism) are smaller, i.e. when the required injection quantity of the in-cylinder injection valve is lower.

A likely approach is to reduce the fuel supply pressure of the high-pressure fuel supply system, or completely cease the fuel supply, at a low load mode of the engine where the required injection quantity of the in-cylinder injection valve is low. Accordingly, the noise encountered in the unnecessary boosting of the fuel supply pressure in the high-pressure fuel supply system as well as the operating noise from the pump can be reduced at least when the load is low.

However, if the fuel supply pressure of the pump of high pressure is once reduced to lower the pressure of fuel supplied to the in-cylinder injection valve in a low load status, fuel injection by the in-cylinder injection valve will be conducted while the fuel supply pressure is not yet boosted to the sufficient level during the transition to a high load. This will be described more specifically with reference to FIG. 5. The fuel supply pressure supplied to the in-cylinder injection valve will not directly exhibit a transition from the fuel supply pressure of low level in a low load mode to the target supply pressure P0 of high level corresponding to the larger required injection quantity, as indicated by the chain with two dots in FIG. 5. A time lag t will occur between a time point t1 where the operating status corresponds to a high load and a time point t2 where the fuel supply pressure attains the level of the target supply pressure P0. In the event of such insufficient boosting in pressure, the injection duration must be extended, corresponding to the low fuel supply pressure, in order to inject fuel of a quantity equal to the required injection quantity from the in-cylinder injection valve.

In the case where the fuel supply pressure of the in-cylinder injection valve is actually greatly lower than the target supply pressure, the injection period will become longer than the injection allowable period. This means that the injected fuel will be short in supply to cause degradation in the engine output. Furthermore, a low fuel injection pressure (the same value as fuel supply pressure) will not facilitate conversion of the injection fuel into fine particle, leading to the problem of deteriorating fuel combustion.

The aforementioned publication of Japanese Patent Laying-Open No. 2001-336439 discloses control to conduct fuel injection reliably corresponding to the required injection quantity by modifying the injection quantity ratio of the in-cylinder injection valve to a low level based on the fuel supply pressure of the high-pressure fuel system. However, this only addresses the lacking injection quantity caused by the insufficient rise of the fuel supply pressure at the starting time. It does not deal with the disadvantage that occurs in a configuration that intentionally reduces the fuel supply pressure of the high-pressure fuel supply system when the operating status of the engine is shifted from a high load to a low load.

SUMMARY OF THE INVENTION

An object of the present invention is to provide a fuel injection control apparatus for an internal combustion engine that can reduce the noise generated from a high pressure fuel supply system as much as possible, and suppress generation of a detrimental effect caused by insufficient fuel supply pressure in the high-pressure fuel supply system when the engine operating status is shifted from a low load to a high load.

According to a first aspect of the present invention, a fuel injection control apparatus for an internal combustion engine includes an in-cylinder injection valve directly injecting fuel supplied from a high-pressure fuel supply system to a combustion chamber, an out-cylinder injection valve injecting fuel to an intake manifold, and a setting unit for setting a higher injection quantity ratio of the in-cylinder injection valve as the internal combustion engine is under status of higher load, wherein the high pressure fuel supply system includes a pressure adjusting unit adjusting the fuel supply pressure to be supplied to the in-cylinder injection valve according to the engine load, and a restricting unit restricting the injection quantity ratio of the in-cylinder injection valve to become lower when the engine load is shifted from a low load to a high load.

Since the fuel supply pressure of the high-pressure fuel supply system is adjusted corresponding to the load on the engine in accordance with the configuration set forth above, generation of noise caused by an unnecessary boosting operation can be suppressed as much as possible, as compared to the case where the fuel supply pressure is set constant. Furthermore, since the injection quantity ratio of the in-cylinder injection valve is set low while the injection quantity ratio of the out-cylinder injection valve is set high even in the case where the load on the engine is increased under the status where the fuel supply pressure of the high-pressure fuel supply system is reduced corresponding to the engine load, the fuel injection quantity of the in-cylinder injection valve becomes smaller. As a result, the fuel injection allowable period for the in-cylinder injection valve can be ensured more readily. Furthermore, insufficient conversion of the injection fuel into fine particles caused by reduction in the fuel injection pressure (fuel supply pressure) of the in-cylinder injection valve, which in turn induces deterioration in combustion, can be suppressed.

According to a second aspect of the present invention, the restricting unit in the fuel injection control apparatus for an internal combustion engine of the first aspect is characterized in that the injection quantity ratio is restricted under the condition that the fuel supply pressure supplied from the high-pressure fuel supply system is lower than the target fuel supply pressure of the in-cylinder injection valve by at least a predetermined pressure.

Under the status of detrimental effects caused by reduction in the fuel supply pressure of the in-cylinder injection valve, i.e. under the status of excessive increase in the fuel injection period and deterioration in conversion into fine particles, occurrence of such detrimental effects can be obviated more reliably by the configuration set forth above. When the fuel supply pressure of the in-cylinder injection valve is high enough, an appropriate fuel injection corresponding to the operating status of the engine can be conducted without unnecessarily reducing the injection quantity ratio.

According to a third aspect of the invention, the restricting unit in the fuel injection control apparatus for an internal combustion engine of the invention of the first aspect is characterized in that the required fuel injection quantity of the in-cylinder injection valve, when exceeding a predetermined quantity, is set equal to the predetermined quantity in an event of restricting the injection quantity ratio.

By applying the configuration set forth above into the invention according to the second aspect, the injection quantity ratio of the in-cylinder injection valve can be restricted by the restricting unit in a manner such that the required fuel injection amount of the in-cylinder injection valve, when exceeding a predetermined quantity, is set equal to the predetermined quantity. By inhibiting in advance any injection that exceeds a predetermined quantity, insufficient injection quantity will not be encountered in practice. Degradation in combustion can be suppressed further reliably under an event where insufficient injection quantity is likely to occur.

The invention according to a fourth aspect of the present invention is characterized in that the restricting unit in the fuel injection control apparatus for an internal combustion engine of the third aspect restricts the injection quantity ratio such that the predetermined quantity is set lower as the engine speed becomes higher.

In the case where the engine speed is low, a longer fuel injection allowable period such as the intake stroke can be ensured, whereby more fuel can be injected from the in-cylinder injection valve. In accordance with the configuration of the fourth aspect, the predetermined quantity can be set more appropriately reflecting change in the injection allowable period based on the engine speed.

The invention according to a fifth aspect is characterized in that the restricting unit in the fuel injection control apparatus for an internal combustion engine according to any of the first to fourth aspects conducts restriction of the injection quantity ratio under the condition that the engine load is at least a predetermined value.

When the engine load is lower than the predetermined value, the period of fuel injection for the in-cylinder injection valve will not exceed the injection allowable period for proper execution, independent of what level the injection quantity ratio of each injection valve is set. In accordance with the configuration of the fifth aspect, unnecessary restriction of the injection quantity ratio of the in-cylinder injection valve can be obviated to allow an appropriate fuel injection reflecting the operating status of the engine.

The invention according to a sixth aspect is characterized in that the high-pressure fuel supply system in the fuel injection control apparatus for an internal combustion engine according to any of the first to fourth aspects includes a pressurization pump boosting the fuel to high pressure, and a metering valve adjusting the quantity of fuel supplied to the in-cylinder injection valve under pressurization by the pressurization pump.

In accordance with the configuration set forth above, noise generated from the high-pressure fuel supply system such as the operating noise from the pressurization pump caused by pressurization of the fuel, the operating noise from the metering valve caused by adjusting the fuel supply pressure, and the like can be suppressed appropriately through the pressure-adjusting action of the pressure adjusting unit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of a fuel injection control apparatus for an internal combustion engine according to the present invention will be described hereinafter with reference to FIGS. 1–5.

Figure 1:
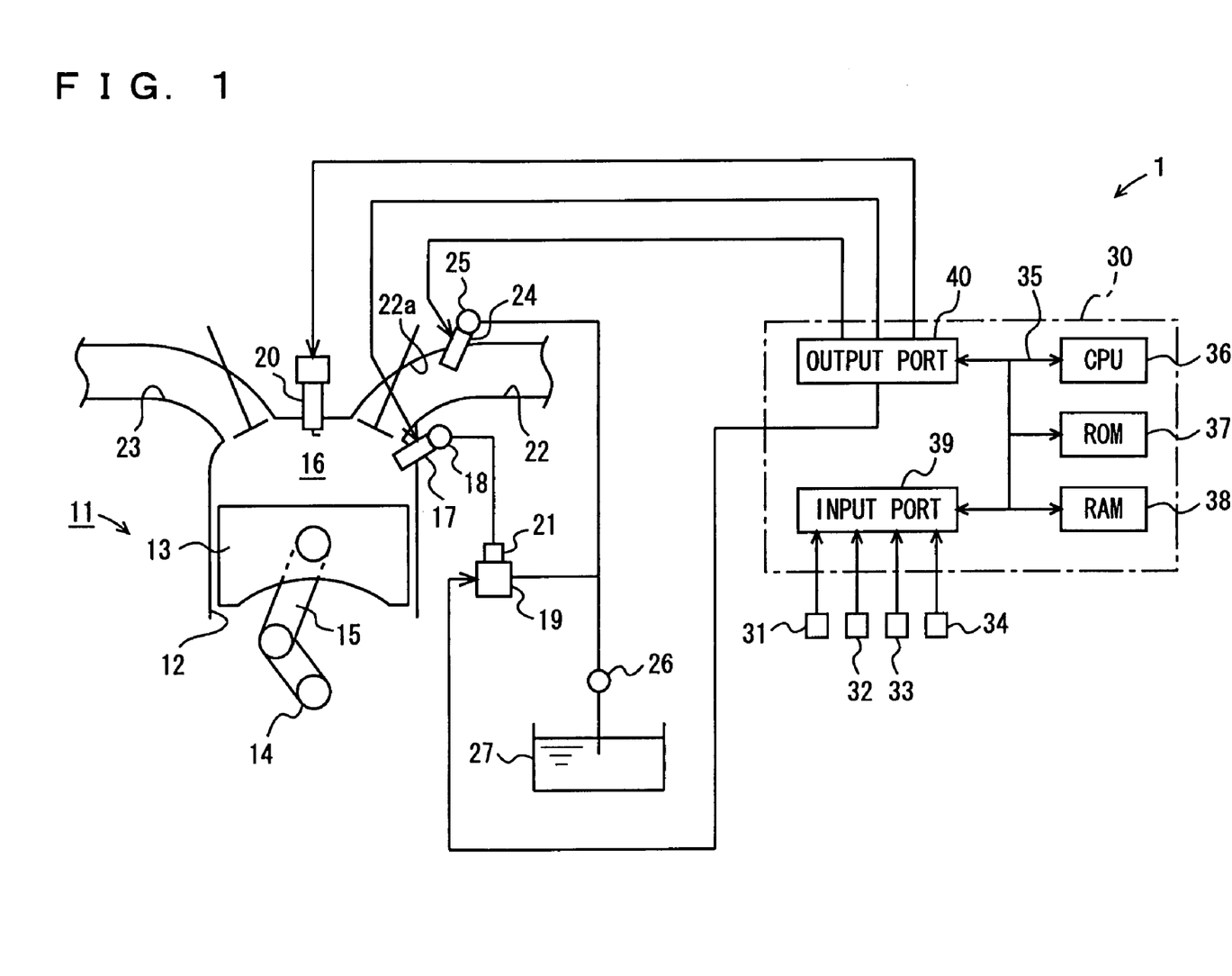
FIG. 1 is a block diagram schematically showing a configuration of a fuel injection control apparatus according to an embodiment of the present invention.

Referring to FIG. 1, an internal combustion engine 11 to which a fuel injection control apparatus 1 of the present invention is applied includes a piston 13 in a cylinder 12. Piston 13 is connected to a crank shaft 14 that is the output shaft of internal combustion engine 11 via a connecting rod 15.

In cylinder 1 and above piston 13, a combustion chamber 16 is formed in partition. An in-cylinder injection valve 17 is attached to cylinder 12. In-cylinder injection valve 17 is connected to a high-pressure pump 19 driven by a cam, via a delivery pipe 18. Fuel of a predetermined pressure is supplied from pump 19. By the opening drive of in-cylinder injection valve 17, fuel is directly injected into combustion chamber 16. A spark plug 20 to produce a spark to fire the air-fuel mixture is attached to combustion chamber 16.

An intake manifold 22 and an exhaust manifold 23 are connected to combustion chamber 16. At an intake port 22a corresponding to the communicating section between combustion chamber 16 and intake manifold 22, an out-cylinder injection valve 24 is attached as an injection valve to inject fuel in intake port 22a. Out-cylinder injection valve 24 is connected to a low-pressure pump 26 via a delivery pipe 25 to supply pressurized fuel at a level lower than the fuel under high pressure supplied to in-cylinder injection valve 17. By the opening valve drive of out-cylinder injection valve 24, the fuel of low pressure is injected into intake port 22a. Low-pressure pump 26 is connected to a fuel tank 27 to draw in and out the fuel in fuel tank 27 to feed the fuel to high-pressure pump 19. High-pressure pump 19 includes a metering valve 21 that closes when the pressure of the fuel is boosted. The fuel supply pressure (fuel supply amount) towards in-cylinder injection valve 17 is adjusted through the change in the valve closing time.

Delivery pipe 18 communicating with in-cylinder injection valve 17 is provided with a fuel pressure sensor 31 detecting the fuel supply pressure of in-cylinder injection valve 17. Fuel injection control apparatus 1 also includes various sensors to detect the operating status of the engine such as a crank sensor 32 to detect the rotation phase (crank angle) of crank shaft 14 and the engine speed, an accelerator sensor 33 to detect the depressed amount of the accelerator pedal (not shown), and an air flow meter 34 to detect the amount of incoming air.

Internal combustion engine 11 having the configuration set forth above is under control of an electronic control device 30 that functions as the setting means, pressure-adjusting means, and restricting means in the present invention. Electronic control device 30 is formed of a digital computer, and includes a CPU (Central Processing Unit) 36, a ROM 37, a RAM 38, an input port 39 and an output port 40, connected to each other via a bidirectional bus 35.

Electronic control device 30 receives via input port 36 a detection signal from various sensors such as fuel pressure sensor 31. Electronic control device 30 controls various elements in internal combustion engine 11 such as in-cylinder injection valve 17 and out-cylinder injection valve 24 according to the operating status of the engine, based on the detection signal from various sensors. In fuel injection control, for example, the entire required injection quantity to be injected is set by electronic control device 30 based on the operating status of the engine, specifically the revolution speed of internal combustion engine 11 and the engine load. The injection quantity ratio is set by electronic control device 30 such that each of in-cylinder injection valve 17 and out-cylinder injection valve 24 provides an appropriate quantity of injection corresponding to the entire required injection quantity. The "load on internal combustion engine 11" is an amount defined by the amount of incoming air per one rotation of internal combustion engine 11, for example.

In the present embodiment, in-cylinder injection valve 17 and out-cylinder injection valve 24 constituting the fuel injection means are configured as set forth below. Since it is difficult to ensure a sufficient period of vaporization through the mixture of injection fuel with the incoming air for in-cylinder injection valve 17, conversion of injection fuel into fine particles must be facilitated. Therefore, in-cylinder injection valve 17 is directed to a fuel injection valve corresponding to a specification of high pressure to inject highly-pressurized fuel raised to a high level in advance by high-pressure pump 19. In contrast, out-cylinder injection valve 24 injects fuel to intake port 22a that supplies air to combustion chamber 16, readily ensuring the period of time required for the mixture with the incoming air for vaporization during the delivery into combustion chamber 16. Therefore, out-cylinder injection valve 24 is directed to a specification of low pressure that injects fuel of a pressure level lower than that of the high-pressure fuel injected by in-cylinder injection valve 17.

Control by fuel injection control apparatus 1 of the above-described configuration will be set forth in detail hereinafter. Electronic control device 30 sets the entire required injection quantity of fuel to be injected according to the operating status of the engine based on a detected signal input at a predetermined cycle from various sensors such as crank sensor 32. When the entire required injection quantity is set according to the engine operating status, fuel injection of the entire required injection quantity is conducted using at least one of in-cylinder injection valve 17 and out-cylinder injection valve 24. When both in-cylinder injection valve 17 and out-cylinder injection valve 24 are used together, each of injection valves 17 and 24 injects an amount of fuel corresponding to each injection quantity ratio, so that the entire required injection quantity is injected in totality at the engine. The injection quantity ratio is set according to, for example, the map shown in FIG. 3. It is appreciated from FIG. 3 that the injection quantity ratio of in-cylinder injection (=required injection quantity; hereinafter, the term "required injection quantity" refers to the amount of fuel injected by in-cylinder injection valve 17) is increased as the engine operating status is under higher load. The heat of vaporization of the injected fuel is used to improved the intake efficiency, and in turn, the engine output.

Furthermore, the fuel supply pressure of the high-pressure fuel supply system (hereinafter, the term "fuel supply pressure" refers to the fuel supply pressure towards in-cylinder injection valve 17 by high-pressure pump 19) is increased to conduct fuel injection corresponding to the required injection quantity in an appropriate manner. Specifically, electronic control device 30 controls the fuel adjusting operation by metering valve 21 such that the fuel supply pressure from high-pressure pump 19 becomes higher (namely, more fuel supply quantity) as the engine load is higher.

The high-pressure fuel supply system is known to be the origin of noise such as the operating noise from high-pressure pump 19 caused during pressurization as well as the operating noise from metering valve 21 caused during adjustment of the fuel supply pressure. In view of this problem, the present embodiment is adapted to reduce the fuel supply pressure of the high-pressure fuel supply system when in a low load status where the required injection quantity is low. This implies significant reduction in pressure of adjusting the level from the highest level to the feed pressure of low-pressure pump 26 (specifically, reduction in pressure from approximately 13 MPa to 0.4 MPa). When the engine operating status has shifted back again to a high load from a low load, the fuel supply pressure reduced in the low load mode is boosted again to obtain the entire required injection quantity corresponding to the torque increase at a high load mode.

Figure 5:
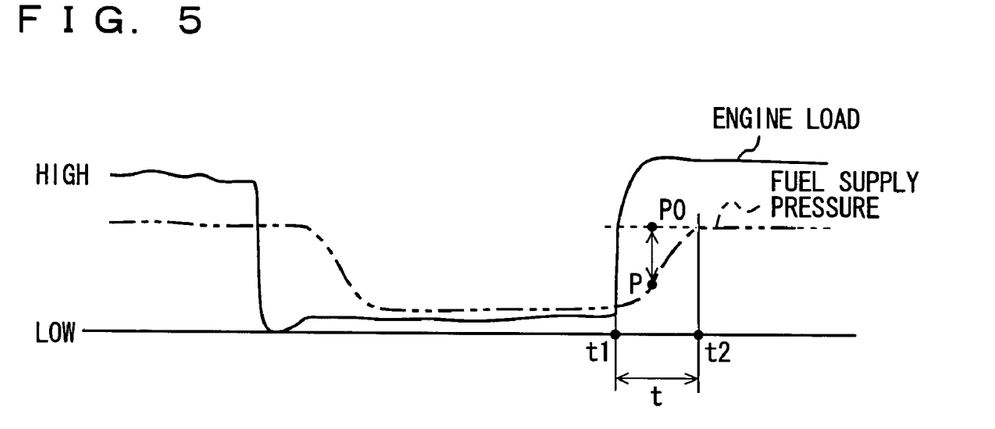
FIG. 5 is a diagram to describe change in the fuel supply pressure of an in-cylinder injection valve according to change in the engine load.

It is to be noted that the fuel supply pressure, when once lowered, requires a certain period of time t to be boosted up to the high target supply pressure of P0, as shown in FIG. 5. It is difficult to achieve prompt boosting. There is a possibility of not being able to inject fuel of a quantity corresponding to the required injection quantity within the injection allowable period that is determined according to the engine operating status during the period of time for the fuel supply pressure to arrive at the level of the target supply pressure P0.

In view of the foregoing, the present embodiment has the required injection quantity of in-cylinder injection valve 17 reduced when there is a possibility of in-cylinder injection valve 17 not being able to inject fuel of the required injection quantity to result in insufficient fuel, based on the determination made that the engine operating status has shifted from a low load to a high load through the detection signal input from crank sensor 32 and the like subsequent to reduction in the fuel supply pressure. Then, control is effected such that the quantity of fuel corresponding to the reduced quantity is compensated for by increasing the out-cylinder injection quantity of out-cylinder injection valve 24. A specific procedure of this control will be described in detail hereinafter with reference to the flow chart of FIG. 2.

Figure 2:
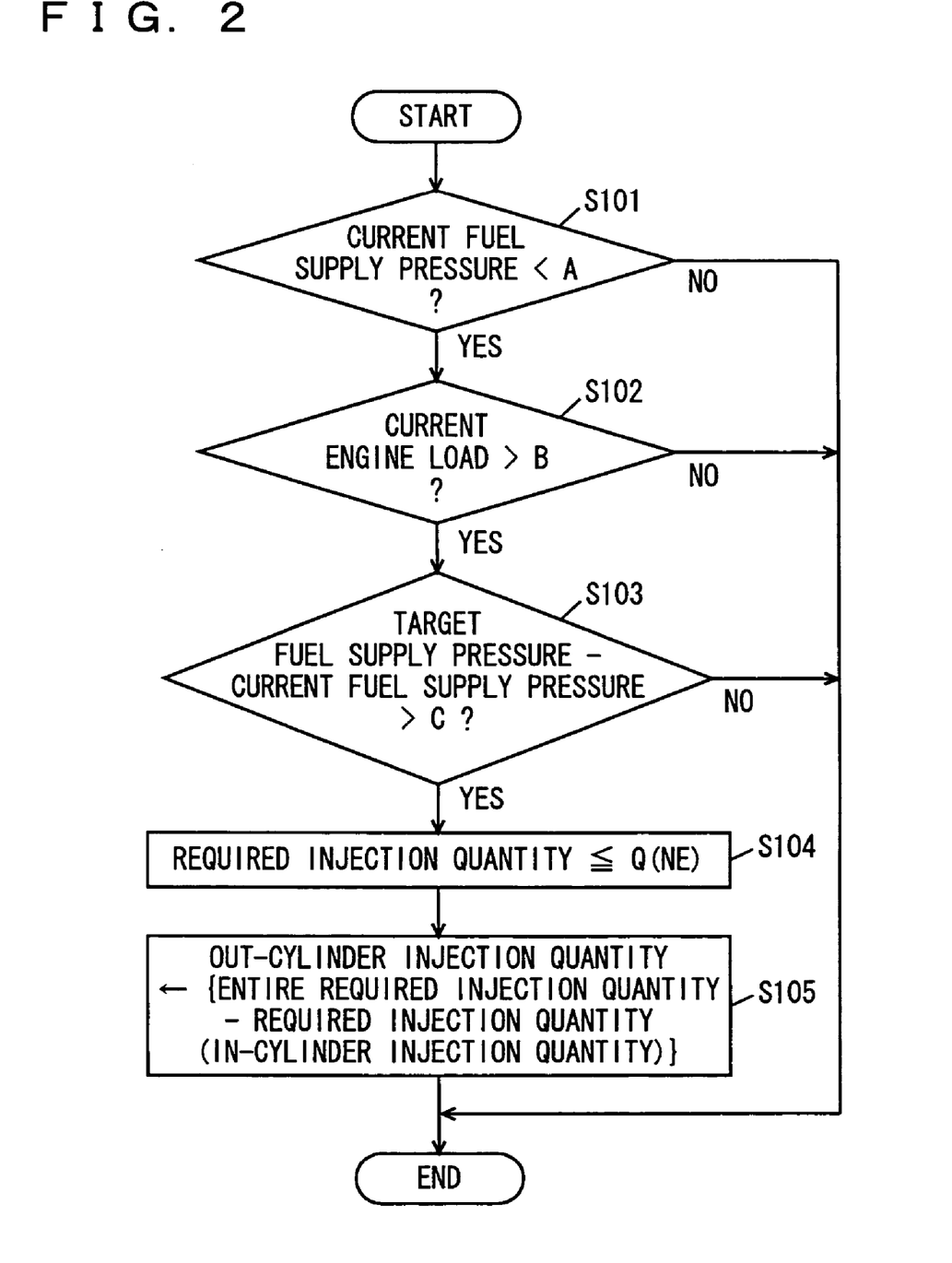
FIG. 2 is a flow chart of a fuel injection control processing routine according to an embodiment of the present invention.
Figure 3:
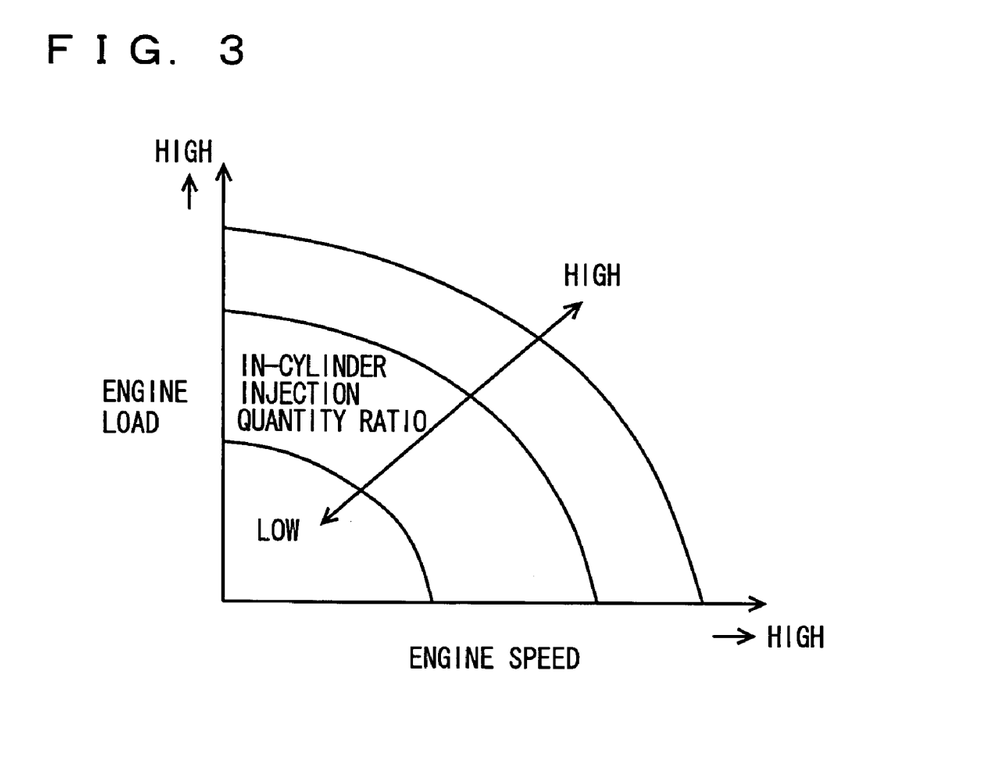
FIG. 3 is a map representing the setting of an injection quantity ratio of an in-cylinder injection valve according to the engine speed and engine load.

In this series of processing, determination is made whether the current fuel supply pressure of in-cylinder injection valve 17 detected by fuel pressure sensor 31 is lower than a preset conditional supply pressure A or not (step 101; "step" abbreviated as S hereinafter). In other words, determination is made whether there is a possibility of insufficient fuel injection caused by insufficient rise of pressure in in-cylinder injection valve 17. In the present embodiment, conditional supply pressure A is set equal to the target supply pressure corresponding to the required injection quantity.

When determination is made that the fuel supply pressure is lower than conditional supply pressure A (YES at S101), determination is made whether the load of the operating status of internal combustion engine 11 exceeds a preset threshold load B or not (S102). In other words, determination is made whether the change in the operating status of internal combustion engine 11 corresponds to a transition to a high load that requires a larger required injection quantity to be set.

When determination is made that the engine load exceeds threshold load B (YES at S102), determination is made whether the difference between the target supply pressure and the current fuel supply pressure (=P0–P) exceeds a predetermined pressure C or not (S103). In other words, determination is made whether the difference in pressure between the target supply pressure and the current per fuel supply pressure is of a level that will induce insufficient fuel injection due to insufficient boosted pressure by in-cylinder injection valve 17.

As used herein, predetermined pressure C is the upper limit of in-cylinder injection valve 17 being able to inject the required injection quantity within the injection allowable period that is defined according to the operating status at the point in time when the fuel supply pressure is detected. If the required injection quantity of in-cylinder injection valve 17 is high, the target supply pressure is increased since fuel injection under high fuel injection pressure (fuel supply pressure) is desired so as to inject a larger amount corresponding to the high required injection amount. In contrast, the target supply pressure is reduced when the required injection quantity is low.

Figure 4:
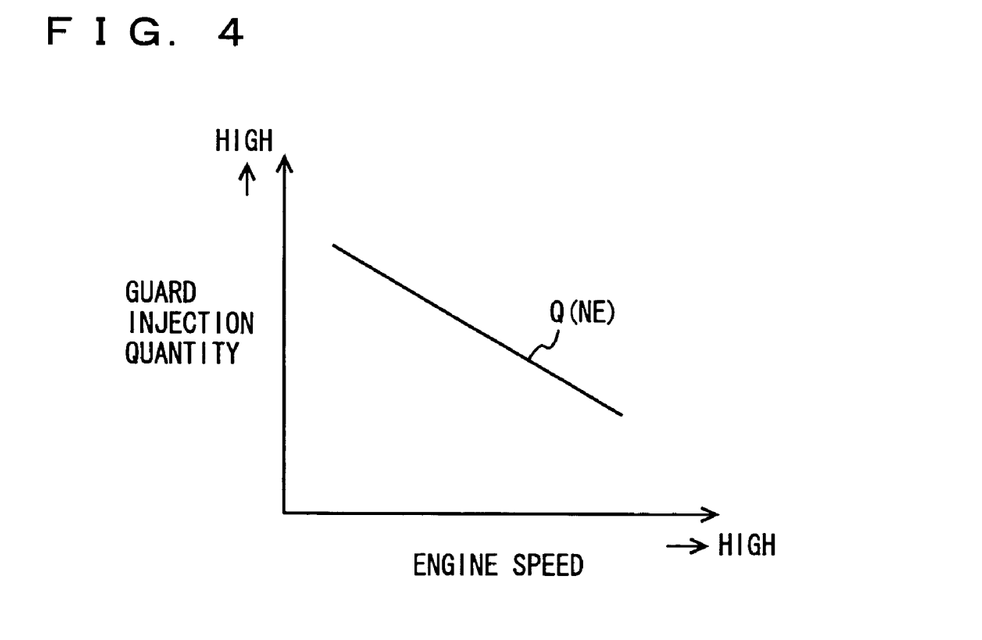
FIG. 4 is a map to obtain a guard injection quantity for the fuel injection quantity by the in-cylinder injection valve.

When determination is made that the value of subtracting the current fuel supply pressure from the target supply pressure exceeds predetermined pressure C (YES at S103), a map of a guard injection quantity Q (NE) based on the revolution speed of internal combustion engine 11 corresponding to the current fuel supply pressure, for example the map shown in FIG. 4, is read out. When the required injection quantity of in-cylinder injection valve 17 is higher than guard injection quantity Q (NE) that takes a value lower than the required injection quantity, the required injection quantity is set afresh to that guard injection quantity Q (NE) (S104).

Guard injection quantity Q (NE) is the upper limit of injection that can be conducted by in-cylinder injection valve within the injection allowable period that is defined according to the operating status of internal combustion engine 11. As shown in FIG. 4, guard injection quantity Q (NE) is set to become lower as the engine speed becomes higher. This is because the event of not being able to inject fuel corresponding to the required injection quantity is less likely to occur when the engine speed is low, so that it is not necessary to set guard injection quantity Q (NE) of the in-cylinder injection amount so low. The reason why fuel inadequacy is less likely to occur is that, when at a low load mode where the revolution speed is low and the required torque is small, a long fuel injection allowable period such as the intake stroke can be ensured, permitting more fuel to be injected from in-cylinder injection valve 17.

The injection quantity (out-cylinder injection quantity) of out-cylinder injection valve 24 is increased to a quantity corresponding to the difference between guard injection quantity Q (NE) and the entire required injection quantity (S105). In the present embodiment, the required injection quantity is set lower to the level of predetermined guard injection quantity Q (NE), and the shortage of fuel caused by the lowered setting is compensated for by increasing the setting of the out-cylinder injection quantity. Upon conducting this procedure, the main routine ends. In accordance with the control of the present embodiment, the injection quantity ratio of in-cylinder injection valve 17 is restricted to be reduced to the level of guard injection quantity Q (NE) when the load on the engine is shifted from a low load to a high load. This control ensures that fuel injection of a quantity is conducted corresponding to the entire required injection quantity in totality at the engine, suppressing the problem of insufficient fuel in the combustion chamber.

Referring to FIG. 2 again, when determination is made that the current fuel supply pressure is not lower than preset conditional supply pressure A (NO at S101), the present process ends. When the current fuel supply pressure is not lower than conditional supply pressure A, the subsequent process (steps S102 and et seq.) is not conducted since it can be considered that there is little or no difference between the current fuel supply pressure and target supply pressure, and boosting to the target supply pressure can be readily achieved even if there is some difference in pressure.

Further, when determination is made that the load of the operating status of internal combustion engine 11 does not exceed threshold load B (NO at S102), the present process ends. In other words, reducing the setting of in-cylinder injection quantity is conducted in the case of high load corresponding to a level where the period of time of fuel injection by in-cylinder injection valve 17 exceeds the injection allowable period, inducing the problem of insufficient injection quantity since fuel injection corresponding to the required injection quantity cannot be conducted. Thus, the subsequent process (steps S103 and et seq.) is not conducted if the engine operating status does not exceed threshold load B.

Further, when determination is made that the value of subtracting the current fuel supply pressure from the target supply pressure does not exceed predetermined pressure C (NO at S103), the present process ends. This is because the required injection quantity can be provided within the injection allowable period if the difference in pressure does not exceed predetermined pressure C even if the fuel supply pressure is low. Thus, the subsequent process (steps S104 and et seq.) is not conducted.

The sequence of respective steps of determining whether the current fuel supply pressure is lower than a preset conditional supply pressure A (S101), whether the load of the operating status of internal combustion engine 11 exceeds threshold load B (S102), and whether the difference between the target supply pressure and the current fuel supply pressure exceeds predetermined pressure C (S103) is not limited to the above-described sequence in the present embodiment, and may be modified.

The present embodiment provides the advantages set forth below.

(1) When in a low load mode corresponding to a small required injection quantity, the pressure is adjusted such that the fuel supply pressure of the high-pressure fuel supply system is reduced. Accordingly, the operating noise generated from the high-pressure fuel supply system such as the operating noise from high-pressure pump 19 caused by pressurization of the fuel, the operating noise from metering valve 21 caused by adjusting the fuel supply pressure, and the like can be minimized, as compared to the case where the fuel supply pressure is set constant.

(2) Even in the case where the load on the engine is increased under the status where the fuel supply pressure of the high-pressure fuel supply system is reduced according to the engine load, the injection quantity ratio of in-cylinder injection valve 17 is reduced while the injection quantity ratio of out-cylinder injection valve 24 is increased (FIG. 2; S104, S105). Therefore, the fuel injection quantity of in-cylinder injection valve 17 is reduced. As a result, the fuel injection allowable period of in-cylinder injection valve 17 can be ensured more readily. Additionally, insufficient conversion of the injection fuel into fine particles caused by reduction in the fuel injection pressure (fuel supply pressure) of in-cylinder injection valve 17, leading to combustion deterioration, can be suppressed.

(3) When determination is made that the difference between the target supply pressure and the current fuel supply pressure exceeds a predetermined pressure C (FIG. 2; YES at S103), the in-cylinder injection quantity of in-cylinder injection valve 17 is set to a lower quantity. Therefore, detrimental effects such as reduction in output due to insufficient fuel injection quantity can be obviated more reliably under the status where the likelihood of insufficient fuel injection quantity due to the large difference in pressure is high. If the pressure difference does not exceed predetermined pressure C, the setting of lower quantity set forth above is not conducted. Unnecessary restriction of the direct fuel injection by in-cylinder injection valve 17 corresponding to the specification of high-pressure into combustion chamber 16 can be eliminated.

(4) When the required injection quantity of in-cylinder injection valve 17 exceeds guard injection quantity Q (NE), the required injection quantity is set to a lower level, equal to guard injection quantity Q (NE) (FIG. 2; S104). Therefore, fuel deterioration can be suppressed further reliably under the status where the likelihood of insufficient fuel injection quantity of in-cylinder injection valve 17 caused by the required injection quantity exceeding guard injection quantity Q (NE) is high.

(5) When determination is made that the current fuel supply pressure is lower than conditional supply pressure A (=target supply pressure) (FIG. 2; YES at S101), and determination is made that the change in the operating status of internal combustion engine 11 corresponds to a transition to a high load exceeding threshold load B (FIG. 2; YES at S102), the in-cylinder injection quantity of in-cylinder injection valve 17 is set to a lower level. Therefore, in the case where the engine operating status is shifted from a low load to a high load, unnecessary restriction of the fuel injection by in-cylinder injection valve 17 directed to the specification of high-pressure into combustion chamber 16 can be suppressed, improving the stability of internal combustion engine 11.

(6) In the present embodiment, guard injection quantity Q (NE) is set to the upper limit value where injection of the required injection quantity is permitted within the injection allowable period that is defined according to the operating status of internal combustion engine 11. When the required injection quantity is reduced to a lower level equal to guard injection quantity Q (NE) in order to avoid insufficient fuel injection quantity, fuel of the required injection quantity subsequent to the reduced setting is reliably injected directly into combustion chamber 16. Therefore, the possibility of fuel deterioration caused by insufficient fuel injection quantity when the fuel supply pressure of in-cylinder injection valve 17 is lower than the conditional supply pressure A (target supply pressure) can be suppressed in an appropriate manner.

(7) Guard injection quantity Q (NE) is read out from a map based on the revolution speed of internal combustion engine 11 in the present embodiment. Guard injection quantity Q (NE) is set lower as the engine speed becomes higher in the map. Therefore, guard injection quantity Q (NE) can be set more appropriately reflecting change in the engine that can conduct injection according to the engine speed.

The present embodiment allows the modification set forth below.

Guard injection quantity Q (NE) is set to the upper limit value that permits injection of the required injection quantity within the injection allowable period that is defined according to the operating status of internal combustion engine 11 in the present embodiment set forth above. However, guard injection quantity Q (NE) can be set to a value lower than the upper limit.

It is assumed that the change in guard injection quantity Q (NE) corresponds to change in the engine speed. However, the change in guard injection quantity Q (NE) may be assumed to correspond to other operating status of internal combustion engine 11 such as the status of temperature, represented by the fuel temperature or temperature of the injection ambient.

Guard injection quantity Q (NE) is set lower as the engine speed is higher (refer to FIG. 4). This is arbitrary, and insufficient injection quantity can be obviated as long as guard injection quantity Q (NE) is set within a range where in-cylinder injection valve 17 can conduct sufficient injection within the injection allowable period.

The advantages of (1)–(4), (6), and (7) set forth above can be achieved even if the step of determining whether the current fuel supply pressure is lower than a preset conditional supply pressure A or not (S101) is omitted.

The advantages of (1)–(4), (6), and (7) set forth above can be achieved even if the step of determining whether the load of the operating status of internal combustion engine 11 exceeds threshold load B or not (S102) is omitted.

The advantages of (1), (2), and (4)–(7) set forth above can be achieved even if the step of determining whether the difference between the target supply pressure and the current fuel supply pressure exceeds a predetermined pressure C or not (S103) is omitted.

The required injection quantity is set to a lower level of predetermined guard injection quantity Q (NE), and the shortage of the fuel quantity caused by the reduction setting is compensated for by increasing the setting towards out-cylinder injection quantity in the present embodiment. It is to be noted that the fuel processing capability and output performance differ between in-cylinder injection valve 17 and out-cylinder injection valve 24. Accordingly, it is not necessarily required to set the fuel corresponding to the reduced quantity of in-cylinder injection valve 17 exactly as the increased amount towards out-cylinder injection valve 24.

Conditional supply pressure A is set equal to the target supply pressure in the above embodiment. However, supply pressure A may be set lower than the target supply pressure.

The fuel supply pressure of in-cylinder injection valve 17 can be estimated from the operating status of internal combustion engine 11 such as the revolution speed of internal combustion engine 11, the entire required injection quantity, and the like, without using fuel pressure sensor 31.

The above embodiment was described based on out-cylinder injection valve 24 that injects fuel to intake port 22a as an out-cylinder injection valve. Alternatively, an injection valve that injects fuel at an intake manifold other than intake port 22a can be employed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fuel injection control apparatus for an internal combustion engine comprising: an in-cylinder injection valve directly injecting fuel supplied from a high-pressure fuel supply system to a combustion chamber, an out-cylinder injection valve injecting fuel to an intake manifold, and setting means for setting a higher injection quantity ratio of said in-cylinder injection valve as said internal combustion engine is under status of higher load,
wherein said high-pressure fuel supply system comprises
pressure adjusting means for adjusting a fuel supply pressure supplied to said in-cylinder injection valve according to an engine load, and
restricting means for restricting the injection quantity ratio of said in-cylinder injection valve to become lower when the engine load is shifted from a low load to a high load.

2. The fuel injection control apparatus for an internal combustion engine according to claim 1, wherein said restricting means restricts said injection quantity ratio under a condition that said fuel supply pressure supplied from said high-pressure fuel supply system is lower than a target fuel supply pressure of said in-cylinder injection valve by at least a predetermined pressure.

3. The fuel injection control apparatus for an internal combustion engine according to claim 1, wherein said restricting means sets the required fuel injection quantity of said in-cylinder injection valve, when exceeding a predetermined quantity, equal to said predetermined quantity in an event of restricting said injection quantity ratio.

4. The fuel injection control apparatus for an internal combustion engine according to claim 3, wherein said restricting means sets said predetermined quantity at a lower level as an engine speed becomes higher in an event of restricting said injection quantity ratio.

5. The fuel injection control apparatus for an internal combustion engine according to claim 1, wherein said restricting means restricts said injection quantity ratio under a condition that the engine load is at least a predetermined value.

6. The fuel injection control apparatus for an internal combustion engine according to claim 1, wherein said high-pressure fuel supply system comprises a pressurization pump boosting the fuel to a high pressure, and a metering valve adjusting the quantity of fuel supplied to said in-cylinder injection valve under pressurization of said pressurization pump.

7. A fuel injection control apparatus for an internal combustion engine comprising: an in-cylinder injection valve directly injecting fuel supplied from a high-pressure fuel supply system to a combustion chamber, an out-cylinder injection valve injecting fuel to an intake manifold, and a setting unit for setting a higher injection quantity ratio of said in-cylinder injection valve as said internal combustion engine is under status of higher load,
wherein said high-pressure fuel supply system comprises
a pressure adjusting unit for adjusting a fuel supply pressure supplied to said in-cylinder injection valve according to an engine load, and
a restricting unit for restricting the injection quantity ratio of said in-cylinder injection valve to become lower when the engine load is shifted from a low load to a high load.

8. The fuel injection control apparatus for an internal combustion engine according to claim 7, wherein said restricting unit restricts said injection quantity ratio under a condition that said fuel supply pressure supplied from said high-pressure fuel supply system is lower than a target fuel supply pressure of said in-cylinder injection valve by at least a predetermined pressure.

9. The fuel injection control apparatus for an internal combustion engine according to claim 7, wherein said restricting unit sets the required fuel injection quantity of said in-cylinder injection valve, when exceeding a predetermined quantity, equal to said predetermined quantity in an event of restricting said injection quantity ratio.

10. The fuel injection control apparatus for an internal combustion engine according to claim 9, wherein said restricting unit sets said predetermined quantity at a lower level as an engine speed becomes higher in an event of restricting said injection quantity ratio.

11. The fuel injection control apparatus for an internal combustion engine according to claim 7, wherein said restricting unit restricts said injection quantity ratio under a condition that the engine load is at least a predetermined value.

12. The fuel injection control apparatus for an internal combustion engine according to claim 7, wherein said high-pressure fuel supply system comprises a pressurization pump boosting the fuel to a high pressure, and a metering valve adjusting the quantity of fuel supplied to said in-cylinder injection valve under pressurization of said pressurization pump.

* * * * *